United States Patent
Kobori et al.

(10) Patent No.: US 10,073,558 B2
(45) Date of Patent: Sep. 11, 2018

(54) POSITION INDICATOR, POSITION DETECTING DEVICE, AND INPUT CONTROL METHOD OF POSITION DETECTING DEVICE

(71) Applicant: Wacom Co., Ltd., Saitama (JP)

(72) Inventors: Takeshi Kobori, Tokyo (JP); Toshihiko Horie, Saitama (JP)

(73) Assignee: WACOM CO., LTD., Saitama (JP)

( * ) Notice: Subject to any disclaimer, the term of this patent is extended or adjusted under 35 U.S.C. 154(b) by 9 days.

(21) Appl. No.: 15/379,369

(22) Filed: Dec. 14, 2016

(65) Prior Publication Data

US 2017/0097724 A1    Apr. 6, 2017

Related U.S. Application Data

(63) Continuation of application No. PCT/JP2015/056900, filed on Mar. 10, 2015.

(30) Foreign Application Priority Data

Jul. 11, 2014 (JP) ................. 2014-143455

(51) Int. Cl.
 *G06F 3/041* (2006.01)
 *G06F 3/044* (2006.01)
 (Continued)

(52) U.S. Cl.
 CPC ........ *G06F 3/0416* (2013.01); *G06F 3/03545* (2013.01); *G06F 3/044* (2013.01); *G06F 3/046* (2013.01); *G06F 2203/04106* (2013.01)

(58) Field of Classification Search
 None
 See application file for complete search history.

(56) References Cited

U.S. PATENT DOCUMENTS

| 5,654,529 A | * | 8/1997 | Yeung | G06F 3/03545 178/19.03 |
| 2007/0146351 A1 | * | 6/2007 | Katsurahira | G06F 3/03545 345/179 |

FOREIGN PATENT DOCUMENTS

| JP | 2-35512 A | 2/1990 |
| JP | 8-69350 A | 3/1996 |

(Continued)

OTHER PUBLICATIONS

International Search Report, dated May 19, 2015, for corresponding International Application No. PCT/JP2015/056900, 3 pages.

*Primary Examiner* — Kenneth B Lee, Jr.
(74) *Attorney, Agent, or Firm* — Seed Intellectual Property Law Group LLP

(57) ABSTRACT

A position detecting device includes two different types of sensors. A position indicator includes resonant circuits that enable detection of the position indicator by a first sensor both when a first end of a chassis of the position indicator is oriented toward the position detecting device and when a second end of the chassis is oriented toward the position detecting device. The position indicator also includes a conductive cap that is provided at the second end of the chassis and that enables detection of the position indicator by a second sensor when the second end is brought close to the position detecting device. A control circuit included in the position detecting device changes processing according to when the control circuit is receiving only one of an output signal from a detection circuit coupled to the first sensor and an output signal from a detection circuit coupled to the second sensor and when the control circuit is receiving the output signals from both detection circuits.

5 Claims, 9 Drawing Sheets

(51) Int. Cl.
  *G06F 3/046* (2006.01)
  *G06F 3/0354* (2013.01)

(56) References Cited

FOREIGN PATENT DOCUMENTS

| | | |
|---|---|---|
| JP | 8-314636 A | 11/1996 |
| JP | 10-171579 A | 6/1998 |
| JP | 2007-249670 A | 9/2007 |
| JP | 2011-3035 A | 1/2011 |
| JP | 2011-3036 A | 1/2011 |
| JP | 2011-128982 A | 6/2011 |

* cited by examiner

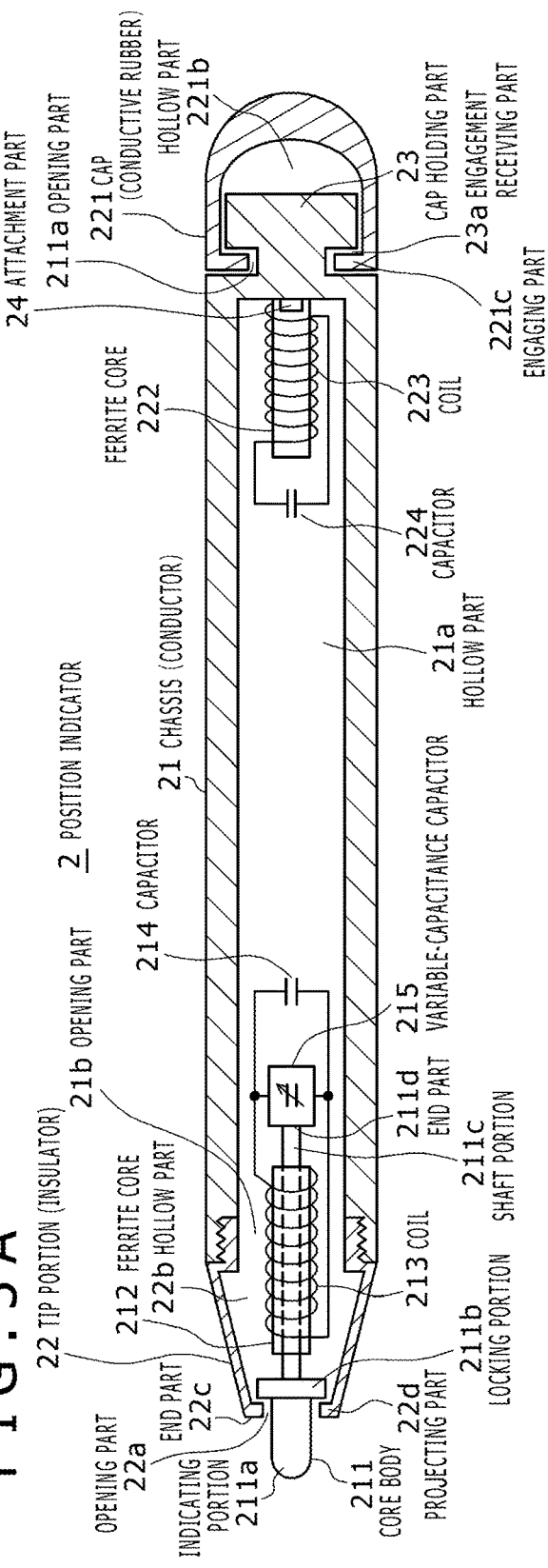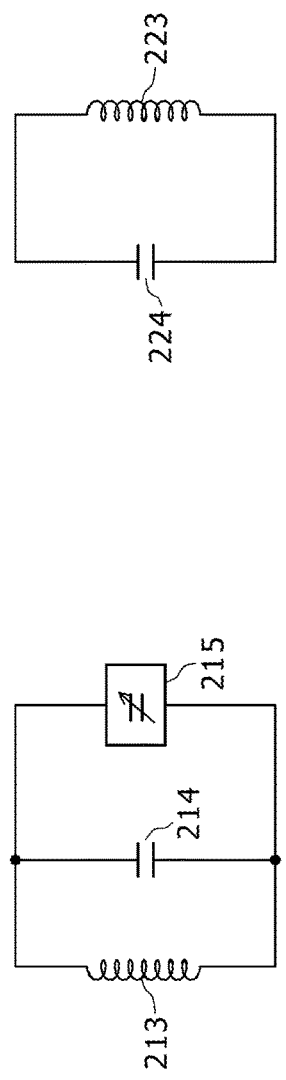
FIG. 5A
FIG. 5B
FIG. 5C

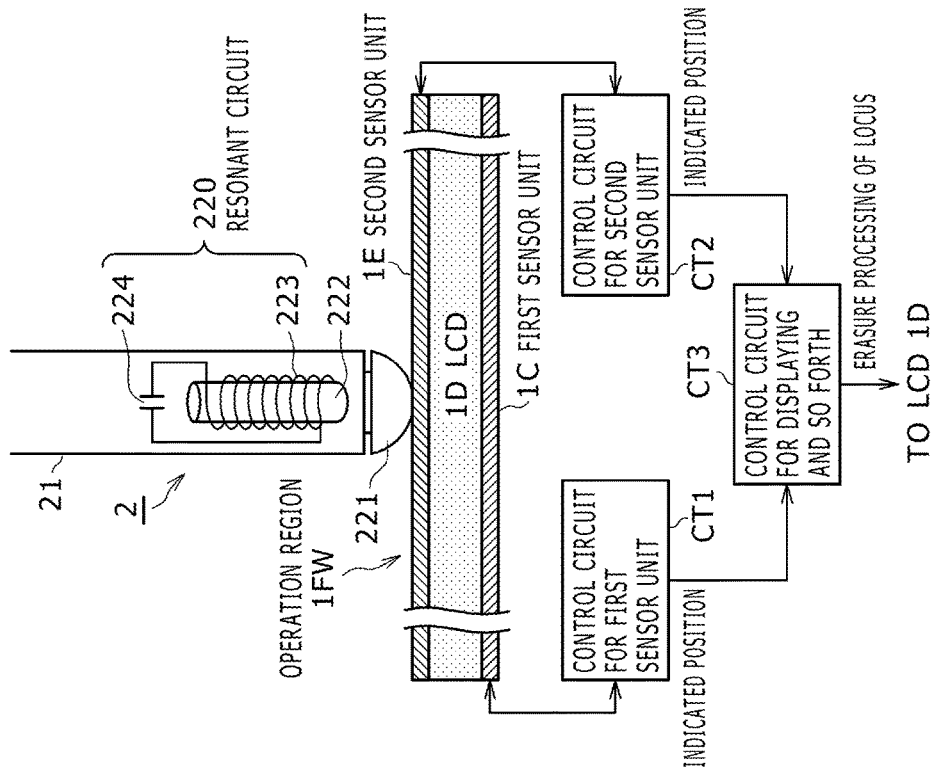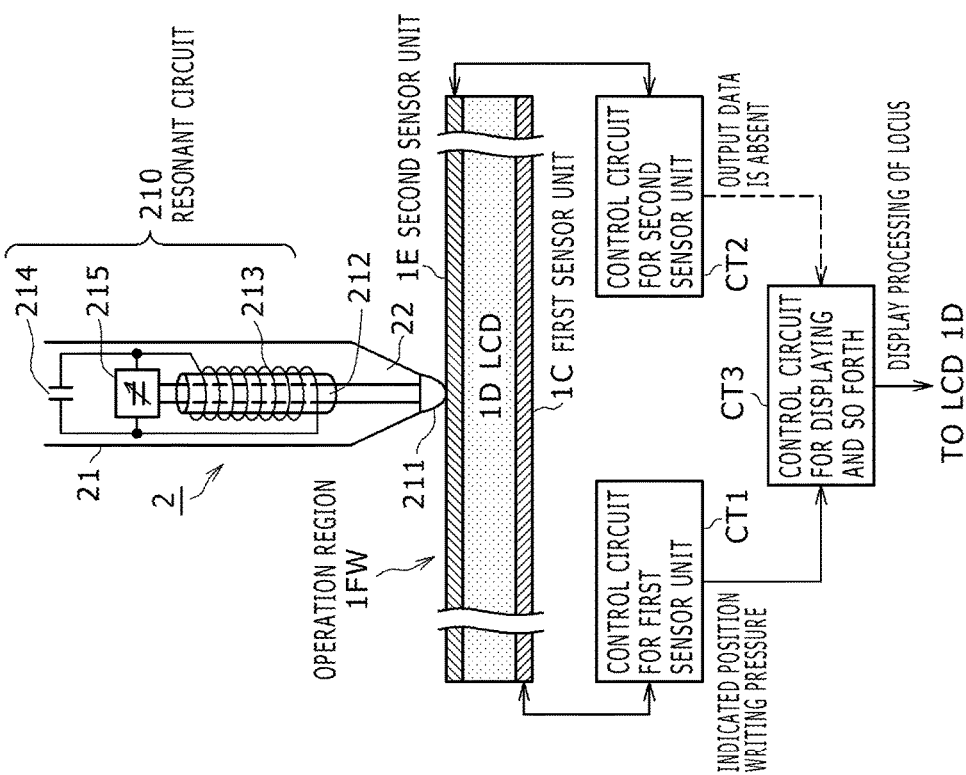

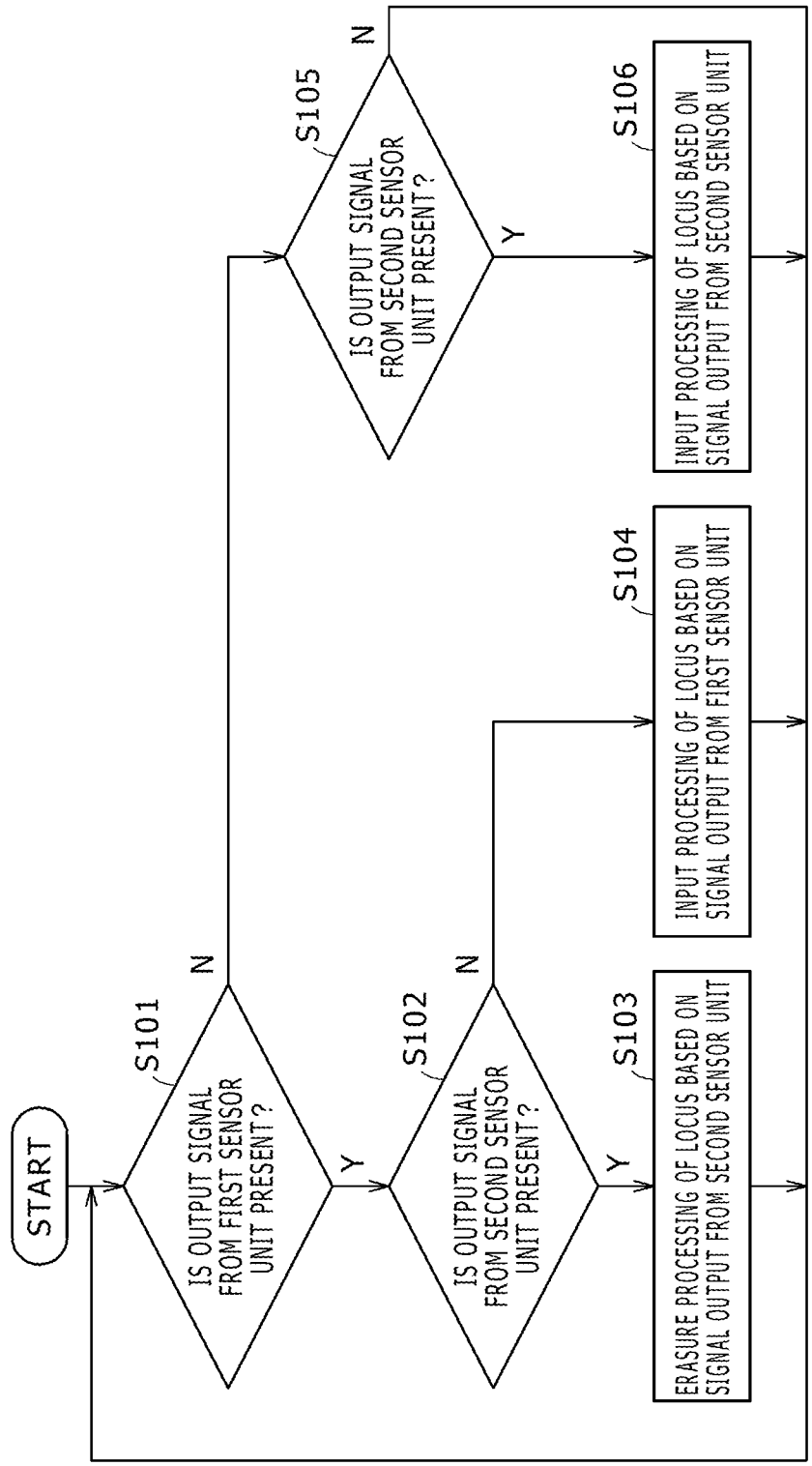

POSITION INDICATOR, POSITION DETECTING DEVICE, AND INPUT CONTROL METHOD OF POSITION DETECTING DEVICE

BACKGROUND

Technical Field

The present disclosure relates to a position detecting device that forms an input device of electronic equipment such as a tablet personal computer (PC) for example, a position indicator, and an input control method used in the position detecting device.

Description of the Related Art

There is an input device of an electromagnetic induction type as one of multiple input devices for inputting information to electronic equipment such as a tablet PC. This input device is composed of a pen-shaped position indicator and a position detecting device having an operation region (operation surface) that accepts pointing operations and inputting of characters, figures, and so forth by use of this position indicator. As described also in Patent Document 1, this position indicator includes a resonant circuit (tuning circuit) composed of a coil and a capacitor and transmits a reflected signal that resonates with a signal transmitted from the position detecting device in which loop coils are provided. In the position detecting device, the reflected signal from the position indicator is received by the loop coils and the position indicated by the position indicator is detected. Moreover, in Patent Document 1, it is also disclosed that resonant circuits are provided at both ends of the pen-shaped position indicator and transmission of information on writing is carried out by one of the resonant circuits and transmission of information on erasure of written information is carried out by the other.

Furthermore, in Patent Document 2, regarding a position indicator of an input device of an electromagnetic induction type, an invention of a position indicator that allows writing at one end and allows erasure of writing at the other end similar to the position indicator described in Patent Document 1 is disclosed. In the case of the position indicator described in Patent Document 2, it is disclosed that the phases of reflected signals transmitted from both end parts of the position indicator are set to reverse phases in order to prevent narrowing of the use region of the phase of a transmission signal according to the writing pressure. Moreover, in Patent Document 3, an invention relating to the following position indicator is disclosed. Specifically, coils are provided at both ends of the position indicator and an oscillating circuit that supplies signals with different frequencies are connected to each of the coils at both ends to allow writing at one end and allow erasure of writing at the other end. The position indicator described in Patent Document 3 is also used for a position detecting device of an electromagnetic induction type.

As above, in the case of an input device of an electromagnetic induction type, information is input to a position detecting device by using a position indicator and thus fine indication of a fine point and input of a detailed figure or the like can be carried out. Furthermore, erasure of input information at a target part can also be carried out by using the position indicator. That is, correction of input information can also be finely carried out.

PRIOR ART PATENT DOCUMENTS

Patent Document 1: Japanese Patent Laid-Open No. 1990-35512
Patent Document 2: Japanese Patent Laid-Open No. 1996-69350
Patent Document 3: Japanese Patent Laid-Open No. 2007-249670

BRIEF SUMMARY

Technical Problems

In recent years, among pieces of electronic equipment such as a tablet PC, electronic equipment including a position detecting device that enables both of minute indication input by use of a position indicator and simple indication input by use of a finger of a user or the like as an indicating body has come to be provided. Such a position detecting device has a configuration in which a sensor of the electromagnetic induction type and a sensor of a capacitive type are stacked.

Among sensors of an electromagnetic induction type are sensors disclosed in the above-described Patent Documents 1 to 3 and so forth. Furthermore, among sensors of a capacitive type, there is a sensor configured by forming electrodes with a predetermined pattern over a transparent substrate or a transparent film (transparent electrically-conductive film), for example. In the case of a sensor of the capacitive type in this example, by detecting a change in the state of the capacitance (capacitive coupling) between an indicating body such as a finger and an electrode when the indicating body approaches, the position on an operation surface of the sensor to which the indicating body gets close (gets contact) can be identified.

As above, in a position detecting device including both of a sensor of an electromagnetic induction type and a sensor of a capacitive type, each of the sensors is separately used to enable input of information. However, it is conceivable that more proper input of information by use of a position indicator with a simpler configuration than ever before is enabled by utilizing a characteristic that the position detecting device includes two kinds of position detecting sensors different in a detection system.

In view of the above, the present disclosure intends to enable more proper input of various kinds of information by utilizing a configuration having two sensors different in a detection system in a position detecting device including these two sensors.

Technical Solution

To solve the above-described problems, an input device of an embodiment according to the present application is composed of a position indicator and a position detecting device that accepts input of information by use of the position indicator. The position detecting device includes a first sensor of a first type, a second sensor of a second type that is disposed overlapping the first sensor, wherein the second type is different from the first type, a first detection circuit which, in operation, detects the position indicator based on an output signal from the first sensor, a second detection circuit which, in operation, detects the position indicator based on an output signal from the second sensor, and a controller coupled to the first and second detection circuits, wherein the controller, in operation, changes contents of processing according when the controller is receiving only one of an output signal from the first detection circuit and an output signal from the second detection circuit and when the controller is receiving both the output signal from the first detection circuit and the output signal from the second detection circuit. The position indicator includes a chassis having a substantially tubular shape with a first end and a second end, the first end being different from the second end, a first indication circuit that is provided at both the first end and the second end of the chassis, wherein the first indication circuit, in operation, enables detection of the position indicator by the first sensor, and a second indication circuit that is provided at the second end of the chassis, wherein the second indication circuit, in operation, enables detection of the position indicator by the second sensor when the second end is brought into contact with the position detecting device.

According to the input device of an embodiment in accordance with the present application, the position detecting device enables changing, by the controller, contents of processing according to when the controller is receiving only one of the output signal from the first detection circuit and the output signal from the second detection circuit and when the controller is receiving both the output signal from the first detection circuit and the output signal from the second detection circuit. The position indicator includes the chassis having a substantially tubular shape and includes the first and second indication circuits in the chassis. The first indication circuit enables detection of the position indicator by the first sensor of the position detecting device. The second indication circuit is provided at one end of the chassis and enables detection of the position indicator by the second sensor of the position detecting device when the one end is brought close to the position detecting device.

Therefore, in the position detecting device, it can be detected that the end at which the second indication circuit is not provided in the position indicator is oriented toward the position detecting device when the position indicator is detected only by the first sensor. On the other hand, in the position detecting device, it can be detected that the end at which the second indication circuit is provided in the position indicator is oriented toward the position detecting device when the position indicator is detected both by the first sensor and by the second sensor.

This enables the position detecting device to execute or perform different kinds of processing regarding input processing of information executed through the position indicator depending on which end of the position indicator is oriented toward the position detecting device. For example, it is possible to enable input of a locus when the end at which the second indication circuit of the position indicator is not provided is oriented toward the position detecting device and enable erasure of an input locus when the end at which the second indication circuit is provided is oriented toward the position detecting device.

In the present specification, a word of "locus" means a figure that is input to electronic equipment and is composed, for example, of a dot, or a line, or both. Furthermore, in operation of inputting a locus, not only an operation of putting a dot or drawing a line but also various gesture operations such as, e.g., a tap operation for selecting an icon or a button and, e.g., a flick operation for page forwarding are included.

Advantageous Effect

According to the present disclosure, in a position detecting device including two sensors having different types of detection systems, input of various kinds of information can be carried out more properly by utilizing a configuration having these two sensors.

BRIEF DESCRIPTION OF THE DRAWINGS

FIGS. 5A, 5B, and 5C depict diagrams for explaining a configuration example of a position indicator of an embodiment.

FIGS. 6A and 6B depict diagrams for explaining one example of use forms of the electronic equipment main body and the position indicator.

FIG. 7 is a flowchart for explaining processing executed by a control circuit for displaying and so forth.

DETAILED DESCRIPTION

One embodiment of a device and method of the present disclosure will be described below with reference to the drawings.

[Concrete Example of Electronic Equipment]

Figure 1:
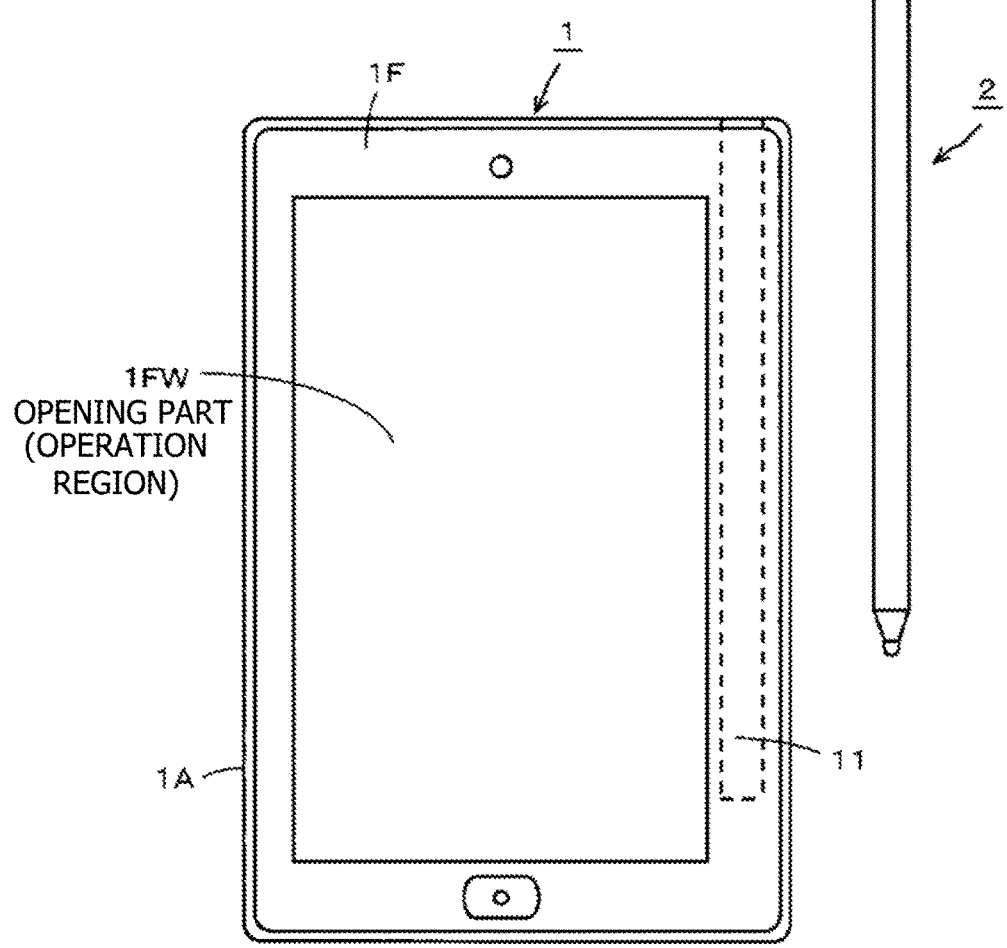
FIG. 1 is a diagram for explaining one example of electronic equipment configured with use of an input device composed of a position detecting device and a position indicator according to an embodiment of the present disclosure.

One example of electronic equipment configured by being equipped with an input device composed of a position detecting device and a position indicator according to an embodiment of the present disclosure will be described with reference to FIG. 1. The electronic equipment of this example is a tablet PC or a high-function mobile phone terminal including a display device such as a liquid crystal display (LCD) for example, and is composed of an electronic equipment main body 1 equipped with the position detecting device and a pen-shaped position indicator 2.

The electronic equipment main body 1 is configured by stacking (disposing in an overlapping manner) an LCD, two position detecting sensors having different types of detection systems, a motherboard, and so forth between a chassis 1A and a front panel 1F. In the present embodiment, one of the two different position detecting sensors is a position detecting sensor of an electromagnetic induction type and the other is a position detecting sensor of a capacitive type.

An opening part 1FW is made in the front panel 1F. The opening part 1FW is set to the same size as a display region of a display screen of the LCD and an operation region that accepts input by a user with use of the position indicator 2 or the like. For this reason, the operation region (operation surface) corresponding to the opening part 1FW of the front panel 1F in the electronic equipment main body 1 will also be described as the operation region 1FW hereinafter. Furthermore, the electronic equipment main body 1 has a housing part 11 that houses the pen-shaped position indicator 2.

The position indicator 2 is used in the case of carrying out input of information through the position detecting sensor of the electromagnetic induction type and erasure of the information input through the position detecting sensor of the electromagnetic induction type. The user takes out the pen-shaped position indicator 2 housed in the housing part 11 according to need and carries out position indication operations on the operation region 1FW. The position indicator 2 is an object suitable to be used in the case of carrying out fine input of information, such as input of a figure or a picture, for example. Furthermore, the electronic equipment main body 1 is equipped with the position detecting sensor of the capacitive type, which allows the user to carry out operations such as drawing, input of handwritten characters, and selection of an icon or a displayed button by bringing a finger of a hand into contact with the operation region 1FW. Hereinafter, the operation of inputting characters and so forth or selecting an icon or the like by the position indicator 2, a finger of the user, or the like will be referred to simply as an "operation."

Furthermore, suppose that an operation is carried out by the position indicator 2 on the operation region 1FW of the electronic equipment main body 1. In this case, the position at which the operation is carried out by the position indicator 2 and writing pressure are detected by the position detecting sensor of the electromagnetic induction type provided inside the electronic equipment main body 1, and according to this, a control circuit for displaying and so forth (microcomputer) in the electronic equipment main body 1 controls display processing for the display screen of the LCD.

Similarly, suppose that, in this electronic equipment, an operation is carried out by a finger of a hand of a user or the like on the operation region 1FW of the electronic equipment main body 1. In this case, the position indicated by the finger or the like is detected by the position detecting sensor of the capacitive type provided inside the electronic equipment main body 1, and according to this, the control circuit for displaying and so forth in the electronic equipment main body 1 controls display processing for the display screen of the LCD.

[Configuration Example of Electronic Equipment Main Body 1]

Figure 2:
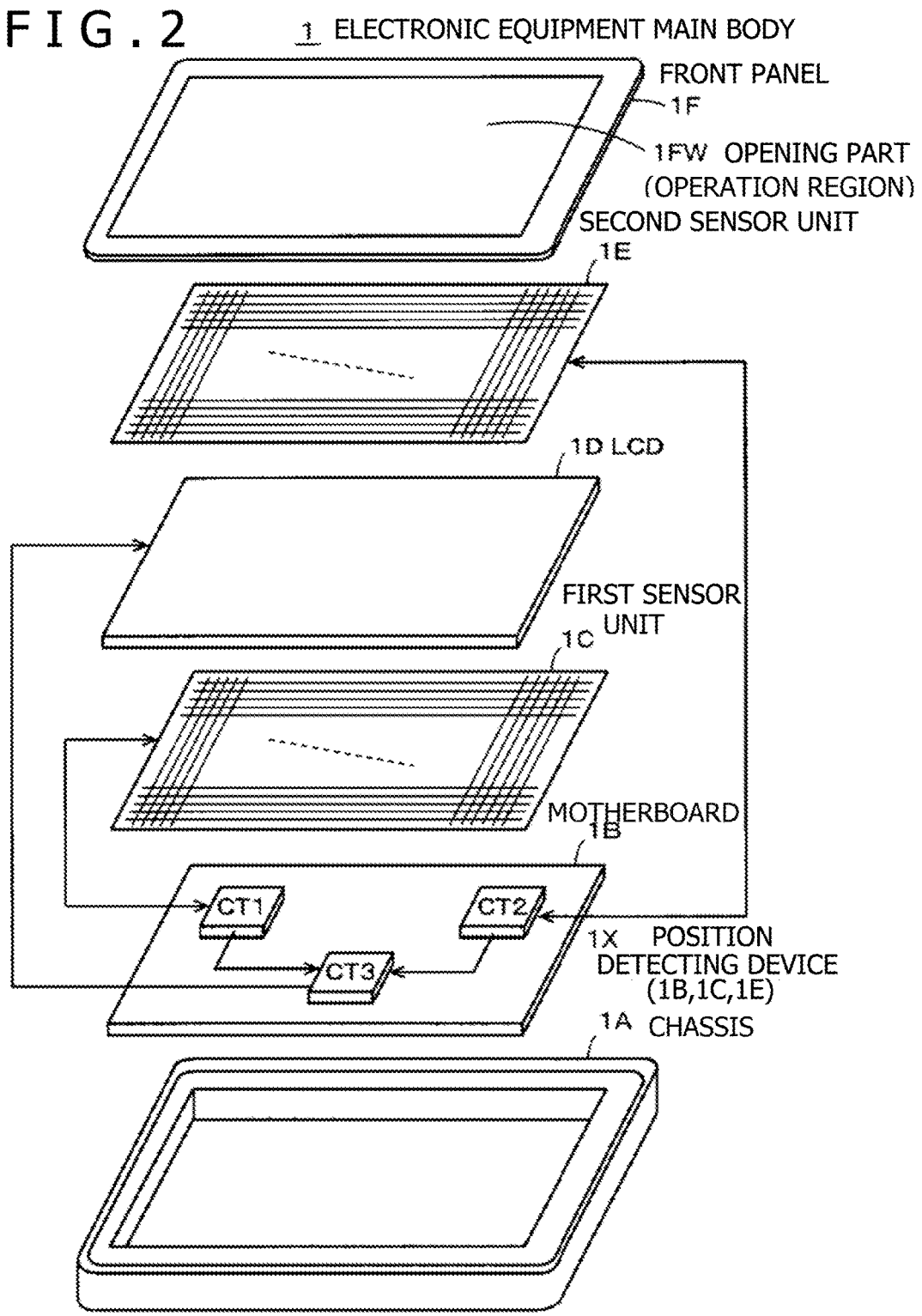
FIG. 2 is an exploded perspective view for explaining a configuration example of an electronic equipment main body configured with use of the position detecting device according to the embodiment of the present disclosure.

A configuration example of the electronic equipment main body 1 for which the position detecting device of the present disclosure is used will be described with reference to FIG. 2. FIG. 2 is an exploded perspective view for explaining the configuration example of the electronic equipment main body 1 configured with use of the position detecting device of the present disclosure. The electronic equipment main body 1 is formed as follows. Specifically, inside the chassis 1A, a motherboard 1B, a first sensor 1C, an LCD 1D, and a second sensor 1E are disposed in a stacked manner (disposed in an overlapped manner) sequentially from a side of the chassis 1A. Furthermore, the front panel 1F seals the chassis 1A.

In the LCD 1D, a display screen is formed on the side of the front panel 1F. Furthermore, the motherboard 1B and the first sensor unit 1C are disposed on the lower side of the LCD 1D, i.e., on the side of the surface opposite to the display screen of the LCD 1D, and the second sensor 1E is disposed on the display screen side of the LCD 1D. The first sensor 1C is a position detecting sensor of an electromagnetic induction type and the second sensor 1E is a position detecting sensor of a capacitive type. A position detecting device 1X of the present embodiment is configured by the motherboard 1B, the first sensor 1C, and the second sensor 1E.

The first sensor 1C and the second sensor 1E have such an area that at least a detection region (not shown) in which both sensors can detect the position indicator 2 or a finger of a hand covers a display region (not shown) of the display screen of the LCD 1D. A position on the operation region of the first sensor unit 1C disposed in an overlapped manner, a position on the display screen of the LCD 1D, and a position on the operation region of the second sensor unit 1E correspond in a one-to-one manner. The second sensor 1E is disposed at a position opposite to the display screen side of the LCD 1D and therefore a substrate having transparency is used.

The opening part 1FW is made in the front panel 1F and the display screen of the LCD 1D can be viewed from the opening part 1FW through the second sensor 1E. In the opening part 1FW of the front panel 1F, a protective plate (not shown) of glass or the like having transparency is disposed. Furthermore, an operation by the position indicator 2, a finger of a hand of a user, or the like is carried out to the part of the opening part 1FW, and the opening part 1FW functions also as the operation region 1FW in which operation of an indicated position or the like is accepted through the first sensor 1C or the second sensor 1E.

On the motherboard 1B, a control circuit CT1 for the first sensor 1C and a control circuit CT2 for the second sensor are provided. The control circuit CT1 controls the first sensor 1C and functions as a first detector that detects a position at which an operation by the position indicator 2 of the user is carried out and a writing pressure on the basis of an output signal from the first sensor 1C. The control circuit CT2 controls the second sensor 1E and functions as a second detector that detects a position at which an operation by a finger of a hand of the user or the like is carried out on the basis of an output signal from the second sensor 1E. Furthermore, on the motherboard 1B, a control circuit CT3 for displaying and so forth that carries out display control for the LCD 1D, on the basis of the output signals from the control circuits CT1 and CT2, is provided. In addition, various circuits such as a communication circuit, for example, are also provided on the motherboard 1B.

In some cases, a so-called magnetic path plate is provided between the motherboard 1B and the first sensor 1C, for example, although not shown in FIG. 2. The magnetic path plate forms a magnetic path for an electromagnetic induction signal (alternating current (AC) magnetic field) generated by each loop coil in a loop coil group provided in the first sensor 1C. This prevents divergence of magnetic flux generated by the respective loop coils, which can improve the detection sensitivity of the position indicated by the position indicator 2. Similarly, the magnetic path plate has a function of preventing radiation of the electromagnetic induction signal to outside of the position detecting device.

[Configuration Example of First Sensor 1C and Control Circuit CT1]

A configuration example of the first sensor 1C of the electromagnetic induction type and the control circuit CT1 thereof mounted in the electronic equipment main body 1 will be described with reference to FIG. 3. The first sensor 1C is configured by providing an X-axis direction loop coil group 111 and a Y-axis direction loop coil group 112 in a stacked manner. The respective loop coil groups 111 and 112 are each composed of 40 or more rectangular loop coils, for example. The respective loop coils configuring the respective loop coil groups 111 and 112 are disposed to be lined up at equal intervals and sequentially overlap with each other.

To the first sensor 1C composed of the loop coil groups 111 and 112, the control circuit CT1 composed of a receiving amplifier AP, an oscillating circuit 120, a position detecting circuit 130, a writing pressure detecting circuit 140, and a microprocessor or controller 150 is connected via a selection circuit 113 and a switch circuit SW. The X-axis direction loop coil group 111 and the Y-axis direction loop coil group 112 are connected to the selection circuit 113. The selection circuit 113 selects an arbitrary loop coil in the two loop coil groups 111 and 112 based on control by the controller 150 to be described later.

The oscillating circuit 120 is composed of an oscillator 121 and a current driver 122. The oscillator 121 generates an AC signal with a frequency f0 and supplies the AC signal to the current driver 122 and a synchronous detector 141 of the writing pressure detecting circuit 140 to be described later. The current driver 122 converts the AC signal supplied from the oscillator 121 to a current and sends out the current to the switch circuit SW. The switch circuit SW switches the connection target (transmitting-side terminal T and receiving-side terminal R) to which the loop coil selected by the selection circuit 113 is connected based on control from the controller 150 to be described later. The current driver 122 and the receiving amplifier AP are connected to the transmitting-side terminal T and the receiving-side terminal R, respectively, of the connection targets.

An induced voltage (received signal) generated in the loop coil selected by the selection circuit 113 is sent out to the receiving amplifier AP via the selection circuit 113 and the switch circuit SW. The receiving amplifier AP amplifies the induced voltage supplied from the loop coil and sends out the amplified voltage to a detector 131 of the position detecting circuit 130 and the synchronous detector 141 of the writing pressure detecting circuit 140.

The detector 131 of the position detecting circuit 130 detects the induced voltage generated in the loop coil, i.e., the received signal, and sends out the received signal to a low-pass filter 132. The low-pass filter 132 has a cutoff frequency sufficiently lower than the frequency f0 and converts the output signal of the detector 131 to a direct current (DC) signal to send out the DC signal to a sample/hold circuit 133. The sample/hold circuit 133 holds a voltage value at a predetermined timing of the output signal of the low-pass filter 132, specifically at a predetermined timing in the reception period, and sends out the voltage value to an analog to digital (A/D) conversion circuit 134. The A/D conversion circuit 134 converts the analog output of the sample/hold circuit 133 to a digital signal and sends out the digital signal to the controller 150.

Meanwhile, the synchronous detector 141 of the writing pressure detecting circuit 140 carries out synchronous detection of the output signal of the receiving amplifier AP with the AC signal from the oscillator 121 and sends out a signal at a level according to the phase difference between them to a low-pass filter 142. The low-pass filter 142 has a cutoff frequency sufficiently lower than the frequency f0 and converts the output signal of the synchronous detector 141 to a DC signal to send out the DC signal to a sample/hold circuit 143. The sample/hold circuit 143 holds a voltage value at predetermined timing of the output signal of the low-pass filter 142 and sends out the voltage value to an analog to digital (A/D) conversion circuit 144. The A/D conversion circuit 144 converts the analog output of the sample/hold circuit 143 to a digital signal and sends out the digital signal to the controller 150.

The controller 150 controls the control circuit CT1 of the first sensor 1C. Specifically, the controller 150 controls selection of the loop coil in the selection circuit 113, switching by the switch circuit SW, and the timing of the sample/hold circuits 133 and 143. The controller 150 causes a signal (electromagnetic induction signal) to be transmitted from the X-axis direction loop coil group 111 and the Y-axis direction loop coil group 112 with a certain transmission continuation time based on input signals from the A/D conversion circuits 134 and 144.

In each loop coil of the X-axis direction loop coil group 111 and the Y-axis direction loop coil group 112, an induced voltage is generated by a signal transmitted from the position indicator 2. The controller 150 calculates the coordinate value of the position indicated by the position indicator 2 in the X-axis direction and the Y-axis direction based on the voltage value of this induced voltage generated in each loop coil. Furthermore, the controller 150 detects the writing pressure based on the phase difference between the transmitted signal and the received signal. In this manner, the position detecting sensor of the electromagnetic induction type is realized by the first sensor 1C and the control circuit CT1 in the present embodiment.

[Configuration Example of Second Sensor 1E and Control Circuit CT2]

Figure 4:
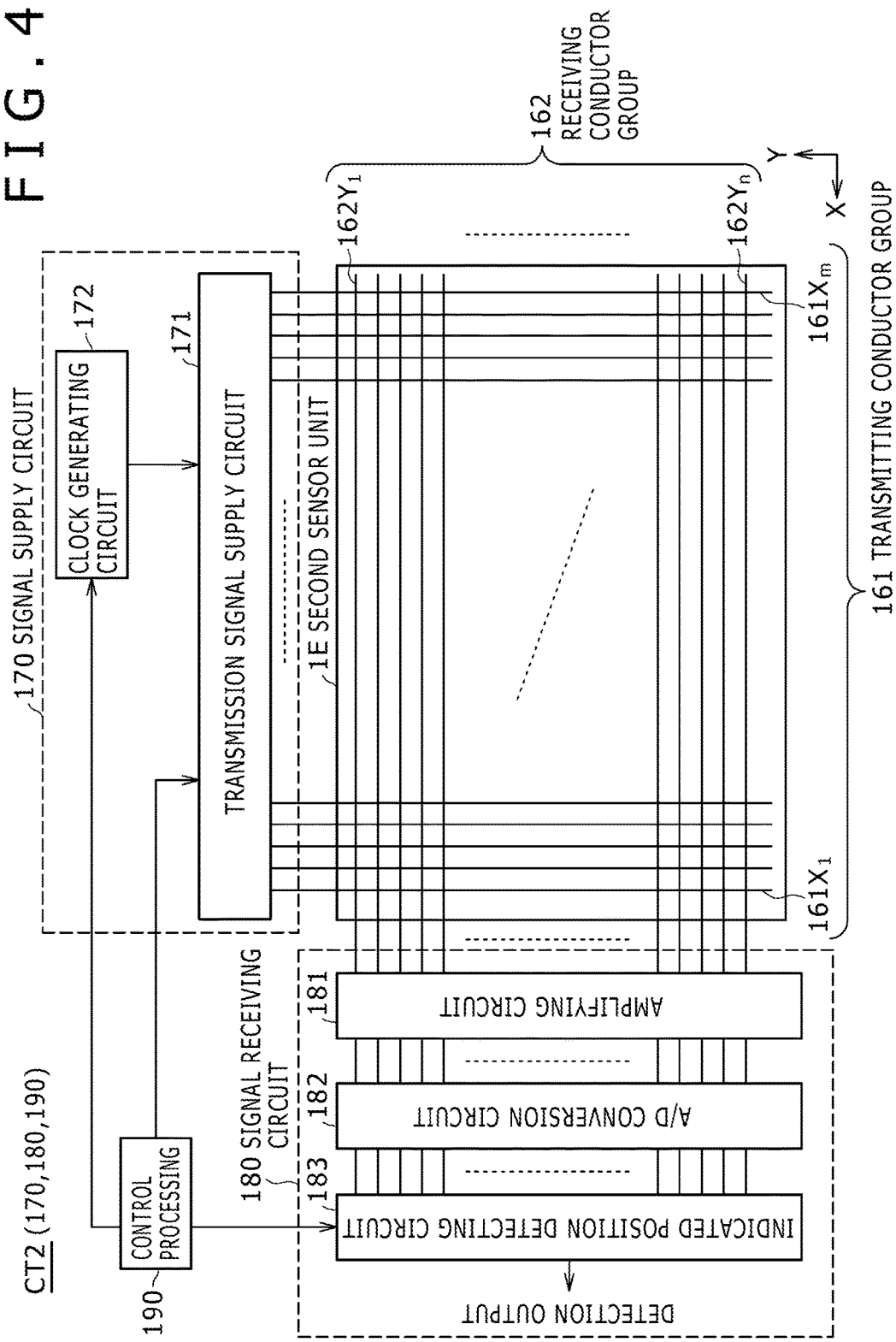
FIG. 4 is a diagram for explaining a configuration example of a second sensor unit of a capacitive type and a control circuit thereof.

A configuration example of the second sensor 1E of the capacitive type and the control circuit CT2 thereof mounted in the electronic equipment main body 1 will be described with reference to FIG. 4. The second sensor 1E is an indicated position detecting sensor of the so-called cross-point capacitive (capacitive coupling) system. To the second sensor 1E, the control circuit CT2 composed of a signal supply circuit 170, a signal receiving circuit 180, and a control processing circuit or controller 190 is connected.

The second sensor 1E is formed by stacking a transmitting conductor group 161, an insulating layer, and a receiving conductor group 162 sequentially from the lower layer side. The transmitting conductor group 161 is obtained by juxtaposing plural linear transmitting conductors $161X_1$, $161X_2, \ldots, 161X_m$ that extend along the Y-axis direction, with the transmitting conductors $161X_1, 161X_2, \ldots, 161X_m$ separated from each other by a predetermined interval. Furthermore, the receiving conductor group 162 is obtained by juxtaposing plural linear receiving conductors $162Y_1$, $162Y_2, \ldots, 161Y_n$ that extend along a direction intersecting the transmitting conductors $161X_1, 161X_2, \ldots, 161X_m$ (X-axis direction in FIG. 4), with the receiving conductors $162Y_1, 162Y_2, \ldots, 161Y_n$ separated from each other by a predetermined interval.

To the transmitting conductor group 161, the signal supply circuit 170 composed of a transmission signal supply circuit 171 and a clock generating circuit 172 is connected. Furthermore, to the receiving conductor group 162, the signal receiving circuit 180 composed of an amplifying circuit 181, an A/D conversion circuit 182, and an indicated position detecting circuit 183 is connected. These signal supply circuit 170 and signal receiving circuit 180 are controlled by the controller 190.

Predetermined signals different from each other are supplied from the transmission signal supply circuit 171 to the second sensor 1E. These predetermined signals are supplied to the respective transmitting conductors $161X_1$, $161X_2, \ldots, 161X_m$ at a timing according to control by the controller 190 and a clock signal from the clock generating circuit 172. Specifically, the transmission signal supply circuit 171 supplies signals with different frequencies for each transmitting conductor, or generates and supplies signals obtained by shifting the phase from a signal of a predetermined coding pattern on each transmitting conductor basis, or supplies signals of code patterns different for each transmitting conductor.

Furthermore, the signal receiving circuit 180 detects a change in the current that flows to the intersection (cross-point) of a respective one of the transmitting conductors 161X$_1$, 161X$_2$, . . . , 161X$_m$ and a respective one of the receiving conductors 162Y$_1$, 162Y$_2$, . . . , 162Y$_n$ on each cross-point basis. In this case, at a position at which an indicating body such as a finger is put over the second sensor 1E, the current is split through the indicating body and thereby the current that flows to the cross-point changes. For this reason, by detecting the cross-point at which the current changes, the position indicated by the indicating body over the second sensor 1E can be detected.

Specifically, in the signal receiving circuit 180, the signal received by the respective receiving conductors 162Y$_1$, 162Y$_2$, . . . , 162Y$_n$ is amplified in the amplifying circuit 181 and is converted to a digital signal in the A/D conversion circuit 182 to be supplied to the indicated position detecting circuit 183. In accordance with control by the controller 190, the indicated position detecting circuit 183 detects a current change at each cross-point by executing arithmetic processing according to the predetermined signal supplied to each of the transmitting conductors 161X$_1$, 161X$_2$, . . . , 161X$_m$ for the digital signal supplied from the A/D conversion circuit 182.

For example, if a signal of a frequency multiplexing system is used as the signal supplied from the transmission signal supply circuit 171 to each of the respective transmitting conductors 161X$_1$, 161X$_2$, . . . , 161X$_m$, the indicated position detecting circuit 183 detects a signal with the target frequency by carrying out a synchronous detection operation with use of a signal with the same frequency as the signal supplied from the transmission signal supply circuit 171 to the respective transmitting conductors 161X$_1$, 161X$_2$, . . . , 161X$_m$. According to the level of this detected signal, the indicated position detecting circuit 183 operates in accordance with control by the controller 190 and detects the position indicated by the indicating body.

Furthermore, if a signal of a phase shift system or a code multiplexing system is used as the signal supplied from the transmission signal supply circuit 171 to each of the respective transmitting conductors 161X$_1$, 161X$_2$, . . . , 161X$_m$, the indicated position detecting circuit 183 calculates a correlation operation value corresponding to the target code by carrying out correlation operations with use of a code corresponding to the code supplied from the transmission signal supply circuit 171 to the respective transmitting conductors 161X$_1$, 161X$_2$, . . . , 161X$_m$. Then, the indicated position detecting circuit 183 operates in accordance with control by the controller 190 and detects the position indicated by the indicating body based on the calculated correlation operation value.

Furthermore, in the case of the indicating body detecting device of the cross-point capacitive coupling system, the device has the configuration in which the plural cross-points are provided on the second sensor 1E as described above. This enables detection of positions indicated by plural indicating bodies (multipoint detection).

An invention about an indicating body detecting device of the cross-point capacitive coupling system using the frequency multiplexing system is disclosed in Japanese Patent Laid-Open No. 2011-3035, and an invention about an indicating body detecting device of the cross-point capacitive coupling system using the phase shift system is disclosed in Japanese Patent Laid-Open No. 2011-3036. Furthermore, an invention about an indicating body detecting device of the cross-point capacitive coupling system using the code multiplexing system is disclosed in Japanese Patent Laid-Open No. 2011-128982.

[Configuration Example of Position Indicator 2]

A configuration example of the position indicator 2 of the present embodiment will be described with reference to FIGS. 5A, 5B, and 5C. Here, FIG. 5A shows the overall configuration of the position indicator 2 formed into a pen shape and shows the state in which a chassis 21 and so forth shown by being given hatched lines are cut into the rear side and the front side and the front side is removed to allow the internal structure to be visually recognized. FIGS. 5B and 5C show equivalent circuits of circuits formed at ends of the position indicator 2.

As shown in FIG. 5A, the position indicator 2 has the chassis 21 formed of an electrically-conductive material (conductor) such as aluminum, for example. The chassis 21 is a tubular member having a hollow part 21a and an opening part 21b is formed on one end in the longitudinal direction. On the one end of the chassis 21, on which the opening part 21b is made, a conical trapezoidal tip portion 22 that is formed of a non-electrically-conductive material (insulator) such as an acrylonitrile butadiene styrene (ABS) resin for example and has an opening part 22a and a hollow part 22b is provided. The diameter of the tip portion 22 decreases toward an end part 22c and the position indicator 2 is formed into the pen shape due to the tip portion 22 and the chassis 21. At the end part 22c of the tip portion 22, a projecting part 22d is formed to protrude toward the inside of the opening part 22a of the tip portion 22.

A core body 211 is used while being made to abut on the operation region 1FW of the electronic equipment main body 1. Thus, in view of resistance against friction, the core body 211 is formed of a non-electrically-conductive synthetic resin such as a polyacetal resin (DURACON) for example. As shown in FIG. 5A, the core body 211 is composed of a bar-shaped indicating portion 211a whose tip is formed into a hemispheric shape, a locking portion 211b that is formed to protrude in a direction intersecting an axial direction of the indicating portion 211a and is locked to the projecting part 22d of the tip portion 22, and a shaft portion 211c formed to extend from the locking portion 211b in the opposite direction to the indicating portion 211a. The core body 211 is disposed inside the chassis 21 in such a manner that the indicating portion 211a protrudes from the opening part 22a of the tip portion 22.

Furthermore, the core body 211 is disposed in such a manner that the shaft portion 211c is inserted in a tubular ferrite core 212 disposed inside the chassis 21 and an end part 221d of the shaft portion 211c abuts against a variable-capacitance capacitor 215 for writing pressure detection provided in the chassis 21. Moreover, the core body 211 is disposed in such a manner that, when an external pressing force (writing pressure) is applied to the indicating portion 211a, the core body 211 can press the variable-capacitance capacitor 215 by sliding toward the other end of the chassis 21 in the axial direction according to the pressing force.

Moreover, when the pressing force applied to the indicating portion 211a of the core body 211 disappears, the core body 211 slides to the end of the tip portion 22 due to the self-weight of the core body 211 and a repelling force of the variable-capacitance capacitor 215. At this time, due to the locking of the locking portion 211b by the projecting part 22d of the tip portion 22, the core body 211 is prevented from protruding to the outside excessively and from dropping off from the chassis 21.

A coil 213 is wound around the ferrite core 212. A capacitor 214 and the variable-capacitance capacitor 215 are connected in parallel with the coil 213. A resonant circuit 210 shown in FIG. 5B is configured on the one end of the chassis 21 by the coil 213, the capacitor 214, and the variable-capacitance capacitor 215, which provides a configuration in which a reflected signal (resonance signal) that resonates with a transmission signal from the above-described first sensor 1C is generated and is transmitted toward the first sensor 1C.

In the resonant circuit 210 shown in FIG. 5B, the variable-capacitance capacitor 215 whose capacitance value changes depending on the pressing force applied to the core body 211 is included. Thus, the reflected signal in which the change in the capacitance of the variable-capacitance capacitor 215 is reflected is generated and is transmitted toward the first sensor 1C. The first sensor 1C and the control circuit CT1 thereof enable detection of the indicated position over the sensor 1C and the writing pressure by detecting the position at which this reflected signal is received and a change in the reflected signal (for example, minute change in the frequency of the reflected signal) caused due to the change in the capacitance.

On the other hand, on the other end of the chassis 21, a cap holding part 23 is provided to protrude in the axial direction of the chassis 21. An engagement receiving part 23a formed to dent in the radial direction of the chassis 21 is made in the cap holding part 23. Furthermore, the cap holding part 23 is formed of an electrically-conductive material similarly to the chassis 21 and is provided by being molded monolithically with the chassis 21. It is also possible to provide the cap holding part 23 by bonding the cap holding part 23 formed as a body separate from the chassis 21 to the chassis 21 through welding or the like.

As shown in FIG. 5A, the cap holding part 23 is covered with a cap 221 formed of electrically-conductive rubber (conductive rubber) for example. The cap 221 is an elastic body in which the tip is formed into a hemispherical shape and an opening part 221a is formed at the rear end. The cap 221 has a hollow part 221b and an engaging part 221c formed to protrude in the radial direction of the cap 221. Furthermore, the cap 221 is attached to the chassis 21 through insertion of the cap holding part 23 into the hollow part 221b from the side of the opening part 221a and engagement between the engaging part 221c and the engagement receiving part 23a of the cap holding part 23. In addition, the cap 221 is so configured that the cap 221 is elastically deformed when being pressed against the operation region 1FW and the contact part with the operation region 1FW becomes wider and thereby detection of position indication by the second sensor becomes easy more surely.

Moreover, an attachment part 24 formed to protrude from the other end of the chassis 21 toward the one end is provided inside the other end of the chassis 21 and a tubular ferrite core 222 is provided around the attachment part 24. A ferrite core similar to the ferrite core 212 provided on the one end is used as the ferrite core 222, and the ferrite core 222 is attached to the inside of the chassis 21 through insertion of the attachment part 24 into the tube hole. A coil 223 is wound around the ferrite core 222. A capacitor 224 is connected in parallel with the coil 223. Due to this, a resonant circuit 220 is configured by the coil 223 and the capacitor 224 as shown in FIG. 5C. The resonant circuit 220 shown in FIG. 5C can generate a reflected signal that resonates with the transmission signal from the above-described first sensor 1C and transmit the reflected signal toward the first sensor 1C.

Therefore, the cap 221 formed of conductive rubber is attached to the other end of the position indicator 2, which provides a configuration that allows detection of the indicated position by the second sensor 1E. Moreover, a configuration that enables detection of the indicated position also by the first sensor 1C is provided by the resonant circuit 220 formed of the coil 223 and the capacitor 224. That is, a configuration is made in which the position indicated by using the side on which the cap 221 is provided in the position indicator 2 can be detected both by the first sensor 1C and by the second sensor 1E.

Furthermore, in the position indicator 2 of the present embodiment, the resonance frequency of the resonant circuit 210 provided on the side of the core body 211 and the resonance frequency of the resonant circuit 220 provided on the side of the cap 221 may be set to the same frequency. Moreover, the resonance frequencies do not necessarily need to be set to the same resonance frequency in the resonant circuit 210 and the resonant circuit 220 and it is also possible to set the resonance frequencies to resonance frequencies different between the resonant circuit 210 and the resonant circuit 220.

[Use Form of Electronic Equipment Main Body 1 and Position Indicator 2]

A specific use of the electronic equipment main body 1 and the position indicator 2 having the above-described configurations will be described. The electronic equipment main body 1 is equipped with the position detecting device 1X having the first sensor 1C of the electromagnetic induction type and the second sensor 1E of the capacitive type. Furthermore, the side of the core body 211 of the position indicator 2 has a configuration that allows the indicated position to be detected only by the first sensor 1C of the electromagnetic induction type, and the side of the cap 221 of the position indicator 2 has a configuration that allows the indicated position to be detected both by the first sensor 1C of the electromagnetic induction type and by the second sensor 1E of the capacitive type. Thus, an operation by the position indicator 2 can input information differently between the case of using the side of the core body 211 and the case of using the side of the cap 221. Specifically, the side of the core body 211 of the position indicator 2 is used for input of a locus, and the side of the cap 221 of the position indicator 2 is used for erasure of an input locus.

One example of a use of the electronic equipment main body 1 and the position indicator 2 will be described with reference to FIGS. 6A and 6B. Here, FIG. 6A shows a case of using an input function of a locus, and FIG. 6B shows a case of using an erasure function of an input locus (eraser function). To simplify the description, in FIGS. 6A and 6B, the LCD 1D and the part relating to the position detecting device 1X composed of the first sensor 1C and the second sensor 1E, which are provided to sandwich the LCD 1D, and the control circuits CT1, CT2, and CT3 are shown regarding the electronic equipment main body 1.

[Input Function of Locus]

In the case of attempting to input a locus of a dot, a line, or the like to the electronic equipment main body 1, the indicating portion 211a of the core body 211 of the position indicator 2 is brought into contact with the operation region 1FW of the electronic equipment main body 1 as shown in FIG. 6A. Then, the position indicator 2 is moved on the operation region 1FW to draw the intended dot or line. In this case, the resonant circuit 210 composed of the coil 213, the capacitor 214, and the variable-capacitance capacitor 215 in the position indicator 2 functions and resonates with a transmission signal transmitted from the first sensor 1C to generate a reflected signal and transmit the reflected signal to the first sensor 1C.

Figure 3:
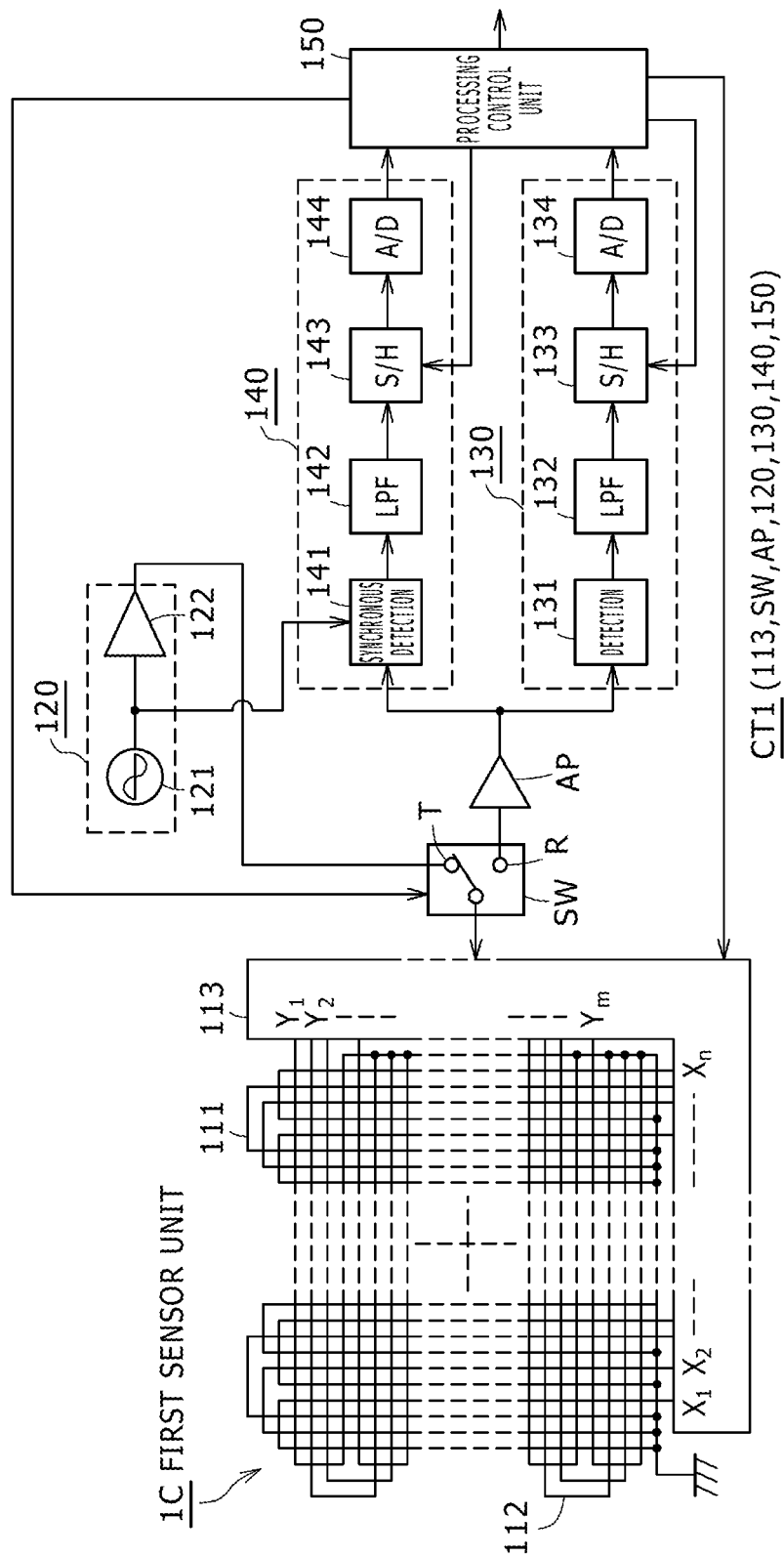
FIG. 3 is a diagram for explaining a configuration example of a first sensor unit of an electromagnetic induction type and a control circuit thereof.

In the first sensor 1C, as described by using FIG. 3, the reflected signal from the position indicator 2 is received by the loop coils near the position indicator 2 and an induced voltage is generated in the loop coils of the first sensor 1C. The control circuit CT1 for the first sensor 1C detects (calculates) the coordinate value of the position indicated by the position indicator 2 based on the level of the voltage value of the induced voltage generated in each loop coil, and detects the writing pressure based on the phase difference between the signal transmitted to the position indicator 2 and the reflected signal received from the position indicator 2. The control circuit CT1 supplies the indicated position and the writing pressure that are detected to the control circuit CT3 for displaying and so forth. On the other hand, the indicated position is not detected by the second sensor 1E of the capacitive type because the core body 211 and the tip portion 22 of the position indicator 2 are non-electrically-conductive components. For this reason, as shown by a dotted line in FIG. 6A, an output signal is not generated from the control circuit CT2 for the second sensor 1E.

If an output signal is generated from the control circuit CT1 for the first sensor 1C and an output signal is not generated from the control circuit CT2 for the second sensor 1E as above, the control circuit CT3 for displaying and so forth determines that indication of an input of a locus is being carried out. In this case, the control circuit CT3 for displaying and so forth executes processing of displaying a locus with a thickness depending on the writing pressure at the indicated position on the display of the LCD according to the indicated position and the writing pressure from the control circuit for the first sensor 1C.

[Erasure Function of Locus]

In the case of attempting to erase an input locus for the electronic equipment main body 1, an erasure is carried out by bringing the cap 221 of the position indicator 2 into contact with the display position of the locus desired to be erased on the operation region 1FW of the electronic equipment main body 1 as shown in FIG. 6B. Then, the position indicator 2 is moved on the operation region 1FW in such a manner as to trace the locus part desired to be erased. In this case, the resonant circuit 220 composed of the coil 223 and the capacitor 224 in the position indicator 2 functions to resonate with a signal transmitted from the first sensor 1C and generate a reflected signal, and this reflected signal is transmitted to the first sensor 1C.

In the first sensor 1C, the reflected signal from the position indicator 2 is received by the loop coils near the position indicator 2 and an induced voltage is generated in the loop coils of the first sensor 1C. The control circuit CT1 for the first sensor 1C detects (calculates) the coordinate value of the position indicated by the position indicator 2 based on the level of the voltage value of the induced voltage generated in each loop coil. Because a variable-capacitance capacitor for writing pressure detection does not exist on a second end of the position indicator 2, detection of the writing pressure cannot be carried out. The control circuit CT1 supplies a signal indicating the detected indicated position to the control circuit CT3 for displaying and so forth.

Meanwhile, the chassis 21, the cap holding part 23, and the cap 221 are all conductors (members having electrical conductivity). Thus, by bringing the cap 221 of the position indicator 2 held with a hand of the user into contact with the operation region 1FW of the electronic equipment main body 1, a current is split through the position indicator 2 at the position at which the cap 221 is put over the second sensor 1E and thereby a current at a cross-point changes. For this reason, as described by using FIG. 4, the position indicated by the position indicator 2 over the second sensor 1E can be detected by detecting the cross-point at which the current changes in the control circuit CT2 for the second sensor 1E. In this case, the control circuit CT2 supplies an output signal indicating the detected indicated position (position information) to the control circuit CT3 for displaying and so forth.

If both of the output signal from the control circuit CT1 for the first sensor 1C and the output signal from the control circuit CT2 for the second sensor 1E exist as above, the control circuit CT3 for displaying and so forth determines that an indication of an erasure of an already-input locus is being carried out. In this case, the control circuit CT3 for displaying and so forth executes processing of erasing the locus existing at the indicated position on the LCD 1D according to the position information from the control circuit CT2 for the second sensor 1E.

As above, when a user carries out an operation while orienting the side of the core body 211 of the position indicator 2 toward the operation region 1FW of the electronic equipment main body 1, a locus of a dot, a line, or the like can be input and fine input of rendering information, such as input of a detailed figure, is enabled. Furthermore, when a user carries out operation while orienting the side of the cap 221 of the position indicator toward the operation region 1FW of the electronic equipment main body 1, the target part of an already-input locus can be erased. Therefore, an intended operation can be carried out to the electronic equipment main body 1 without taking trouble to carry out switching between a locus input mode and a locus erasure mode for the electronic equipment main body 1.

Furthermore, for the position indicator 2, there is also no need to take a measure such as providing resonant circuits different in the resonance frequency at both ends or reversing the phase of the resonance frequency in resonant circuits provided at both ends as in conventional pen-shaped position indicators. In addition, means for writing pressure detection such as a variable-capacitance capacitor is also not provided at both end parts of the pen-shaped position indicator. It suffices to provide the means for writing pressure detection only on the side of the core body 211 used for input of a locus. As a result, the configuration of the position indicator 2 can be made simpler than that of conventional position indicators.

Moreover, in the position detecting device 1X mounted in the electronic equipment main body 1, there is also no need to execute processing such as determining which end of the position indicator is oriented toward the device from the frequency of a received signal as in the case of using a conventional position indicator. Specifically, in the case of the position detecting device 1X of the present embodiment, whether an input of a locus is being attempted or an erasure of an input locus is being attempted can be properly determined according to whether the output signals from the first control circuit CT1 and the second control circuit CT2 are present or absent. Therefore, a determination of whether an input of a locus is being attempted or an erasure of an input locus is being attempted can be realized without executing complicated processing such as carrying out a determination based on discrimination of the frequency of a reflected signal from the position indicator.

If a user carries out an operation with a finger of a hand or the like to the electronic equipment main body 1 equipped with the position detecting device 1X, the resonant circuits 210 and 220 like those mounted in the position indicator 2 are not detected. Thus, the operation by the user is detected by only the second sensor 1E and the operation is not detected by the first sensor 1C. Therefore, in this case, the control circuit CT3 for displaying and so forth can accept an input of a locus based on the output signal from the control circuit CT2 for the second sensor 1E. Specifically, the control circuit CT3 for displaying and so forth can accept an operation to an icon or a displayed button according to the indicated position and execute processing according to the selected icon or displayed button.

[Summarization of Operation of Control Circuit CT3 for Displaying and So Forth]

Next, processing executed or performed in the control circuit CT3 for displaying and so forth mounted in the electronic equipment main body 1 of the present embodiment will be summarized. FIG. 7 is a flowchart for explaining the processing executed or performed by the control circuit CT3 for displaying and so forth shown in FIG. 2 and FIG. 6. The processing of the flowchart shown in FIG. 7 is processing always executed by the control circuit CT3 for displaying and so forth when the electronic equipment main body 1 has been powered on.

First, the control circuit CT3 for displaying and so forth determines whether or not the output signal from the control circuit CT1 for the first sensor 1C is present (step S101). When determining that the output signal from the control circuit CT1 is present in the determination processing of the step S101 (in the case of Y of the step S101), the control circuit CT3 for displaying and so forth determines whether or not the output signal from the control circuit CT2 for the second sensor 1E is present (step S102).

Suppose that the control circuit CT3 for displaying and so forth determines that the output signal from the control circuit CT2 is present in the determination processing of the step S102 (in the case of Y of the step S102). In this case, the display control circuit CT3 is in the state in which the output signal is being supplied from both of the control circuit CT1 and the control circuit CT2. Thus, the display control circuit CT3 determines that indication input to the electronic equipment main body 1 is being carried out with use of the side of the cap 221 of the position indicator 2.

Thus, the control circuit CT3 for displaying and so forth determines that the operation being carried out to the electronic equipment main body 1 is an indication of an erasure of a locus that has been input. Then, the control circuit CT3 for displaying and so forth in the present embodiment executes erasure processing of a locus displayed (rendered) at the indicated position (position that is indicated) based on the output signal from the second sensor 1E (step S103). Thereafter, the control circuit CT3 for displaying and so forth repeats the processing from the step S101.

The cap 221 on the second end of the position indicator 2 is formed of conductive rubber and the area of abutting against the operation region 1FW is also a somewhat wide range. For this reason, the erasure range desired by the user (already-input locus) can be easily specified without detecting the writing pressure and so forth. Furthermore, even when part of a locus is left unerased, the target locus can be erased by carrying out an operation with use of the second end (side of the cap 221) of the position indicator 2 again.

Furthermore, suppose that the control circuit CT3 for displaying and so forth determines that the output signal from the control circuit CT2 is absent in the determination processing of the step S102 (in the case of N of the step S102). In this case, the control circuit CT3 for displaying and so forth is in the state in which only the output signal from the control circuit CT1 is being supplied. Thus, the control circuit CT3 for displaying and so forth determines that an operation is being carried out to the electronic equipment main body 1 with use of the side of the core body 211 of the position indicator 2. Thus, the control circuit CT3 for displaying and so forth determines that the operation being carried out to the electronic equipment main body 1 is an input of a locus, and executes input processing of the locus based on the output signal from the first sensor 1C (step S104). Thereafter, the control circuit CT3 for displaying and so forth repeats the processing from the step S101.

Moreover, also when determining that the output signal from the control circuit CT1 does not exist in the determination processing of the step S101 (in the case of N of the step S101), the control circuit CT3 for displaying and so forth determines whether or not the output signal from the control circuit CT2 for the second sensor 1E is present (step S105). Suppose that the control circuit CT3 for displaying and so forth determines that the output signal from the control circuit CT2 is present in the determination processing of the step S105 (in the case of Y of the step S105). In this case, the control circuit CT3 for displaying and so forth is in the state in which only the output signal from the control circuit CT2 is being supplied. Therefore, by the control circuit CT3 for displaying and so forth, it is determined that an operation is being carried out to the electronic equipment main body 1 not by the position indicator 2 but by a finger of a hand of the user or a dedicated pen (position indicator) for a sensor of the capacitive type, for example. Thus, the control circuit CT3 for displaying and so forth determines that the operation being carried out to the electronic equipment main body 1 is an input of a locus, and executes input processing of the locus based on the output signal from the second sensor 1E (step S106). In this case, besides execution of processing according to selection of an icon or a displayed button and so forth, drawing by use of a finger or a dedicated pen for a sensor of the capacitive type and so forth can be carried out. Thereafter, the control circuit CT3 for displaying and so forth repeats the processing from the step S101.

Furthermore, suppose that the control circuit CT3 for displaying and so forth determines that the output signal from the control circuit CT2 is absent in the determination processing of the step S105 (in the case of N of the step S105). In this case, an output signal is being supplied neither from the control circuit CT1 nor from the control circuit CT2. Thus, by the control circuit CT3 for displaying and so forth, it is determined that an operation is not being carried out to the operation region 1FW of the electronic equipment main body 1. Then, the control circuit CT3 for displaying and so forth does not carry out control of displaying and so forth and repeats the processing from the step S101.

As described above, in the input device composed of the position detecting device 1X and the position indicator 2 in the present embodiment, the function relating to operation can be automatically switched depending on how the position indicator 2 is used. Specifically, input processing of a locus can be executed when an operation is carried out by using the side of the core body 211 of the position indicator 2, and erasure processing of a locus that has been input can be executed when an operation is carried out by using the side of the cap 221 of the position indicator 2. In this case, the user does not switch the input mode for the position detecting device 1X. In addition, it is also possible to properly accept and process both of an operation with use of the position indicator 2 and an operation to the first sensor 1C of the capacitive type with use of a finger of a hand of the user or the like.

Modification Example 1 of Position Indicator 2

A position indicator 2A that is a modification example of the position indicator 2 will be described by using FIG. 8. In the position indicator 2A shown in FIG. 8, a part configured similarly to the position indicator 2 shown in FIG. 5 is given the same reference symbol and description of the part is omitted.

Regarding the position indicator 2 of the above-described embodiment, the case of employing the configuration in which the resonant circuit 210 is provided on the side of the core body 211 and the resonant circuit 220 is provided on the side of the cap 221 as described by using FIG. 5 is described. However, the configuration of the position indicator of the present disclosure is not limited thereto. For example, as shown in the position indicator 2A of FIG. 8, a resonant circuit does not need to be provided on the side of the cap 221 if the resonant circuit 210 provided on the side of the core body 211 generates a sufficiently-intense magnetic field when the side of the cap 221 is used in contact with the operation region 1FW.

In this case, the position indicated by the position indicator 2A can be detected by the second sensor 1E of the electronic equipment main body 1 through the position indicator 2A. Moreover, a reflected signal generated by the resonant circuit 210 mounted in the position indicator 2A can be detected by the first sensor 1C of the electronic equipment main body 1. When the side of the cap 221 of the position indicator 2A is used in contact with the operation region 1FW of the electronic equipment main body 1, the distance between the resonant circuit 210 of the position indicator 2A and the first sensor 1C of the electronic equipment main body 1 is long. For this reason, it is difficult to identify a position indicated in a small range over the first sensor 1C as in the case of inputting a locus by using the side of the core body 211 of the position indicator 2A. However, because a sufficiently-intense magnetic field is generated, it can be detected that the position indicator 2A is located over the first sensor 1C.

Thus, when the side of the cap 221 of the position indicator 2A, in which a resonant circuit is not provided on the side of the cap 221, is used in contact with the operation region 1FW of the electronic equipment main body 1, an indication of an erasure of an already-input locus can be carried out and erasure processing of the locus can be executed similarly to the case described by using FIG. 6B by detecting the position indicated by the position indicator 2A both by the first sensor 1C and by the second sensor 1E.

Figure 8:
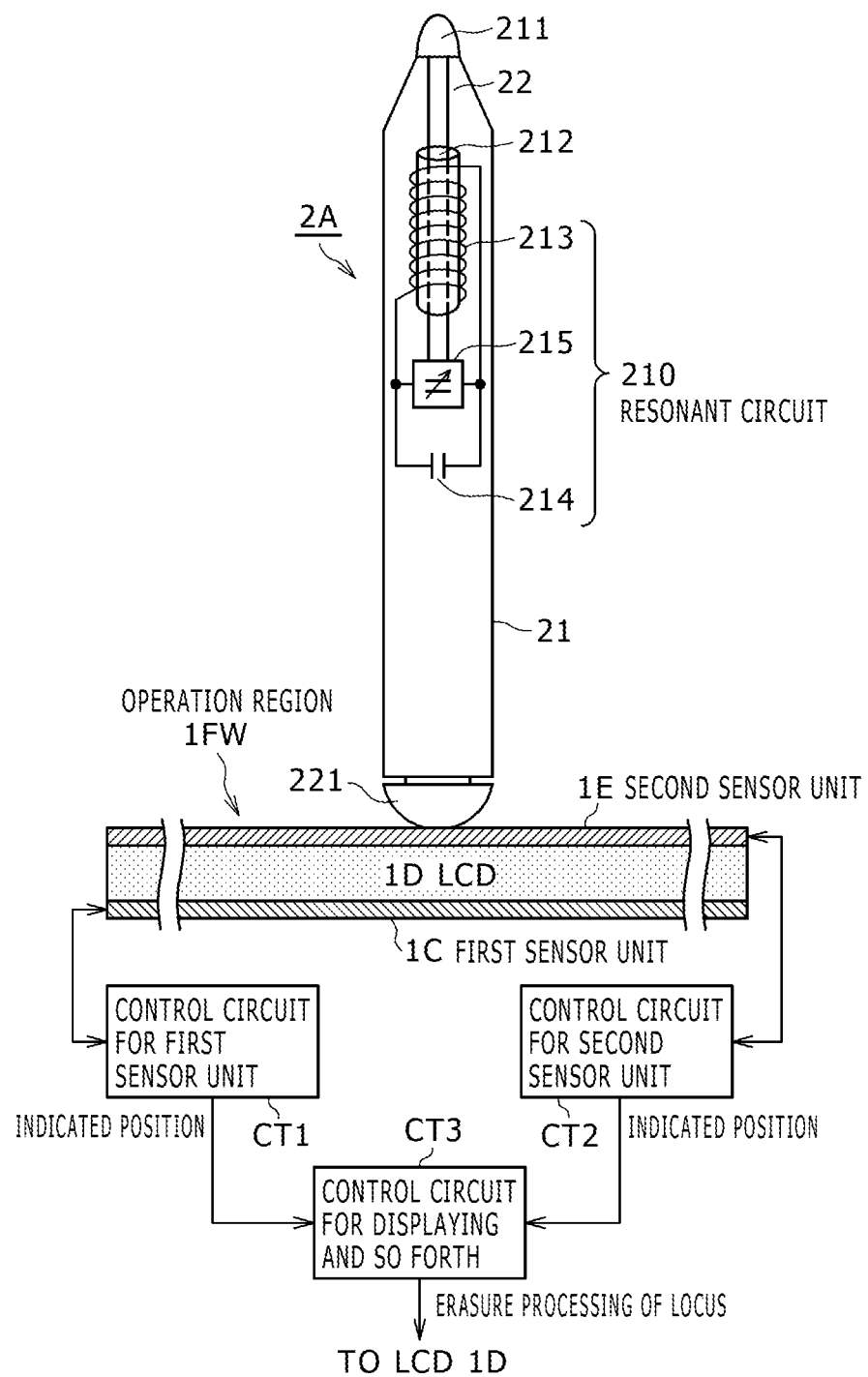
FIG. 8 is a diagram for explaining another example of the position indicator.

On the other hand, when an operation is carried out while the side of the core body 211 of the position indicator 2A shown in FIG. 8 is brought into contact with the operation region 1FW of the electronic equipment main body 1, the position indicated by the position indicator 2A can be detected only by the first sensor 1C. Therefore, when an operation is carried out while the side of the core body 211 of the position indicator 2A is brought into contact with the operation region 1FW of the electronic equipment main body 1, input processing of a locus can be executed similarly to the case described by using FIG. 6A. Furthermore, in the case of the position indicator 2A shown in FIG. 8, the configuration can be made simpler than the position indicator 2 described by using FIG. 5.

Modification Example 2 of Position Indicator 2

The first sensor 1C mounted in the electronic equipment main body 1 of the above-described embodiment is a sensor of an electromagnetic induction type. Furthermore, in the above-described embodiment, a configuration is employed in which a signal is transmitted from the first sensor 1C of the electronic equipment main body 1 and a reflected signal (resonance signal) generated by the resonant circuit 210 or 220 of the position indicator 2 in response to this signal is received by the first sensor 1C. However, if the position indicator itself includes a signal generating circuit that generates the same signal as this reflected signal, a configuration in which a signal is not transmitted from the first sensor 1C to the position indicator can be employed.

A position indicator 2B that is a modification example of the position indicator 2 will be described with reference to FIG. 9. The position indicator 2B of this example has a configuration in which the position indicator 2B itself includes a signal generating circuit 230 and the signal generating circuit 230 is connected to both of the resonant circuit 210 and the resonant circuit 220. The signal generating circuit 230 is composed of an oscillator that generates a signal with a predetermined frequency, a power supply circuit including a battery, and so forth. Except for that the position indicator 2B includes the signal generating circuit 230, the other parts are configured similarly to those of the position indicator 2 of the embodiment described above by using FIG. 5. Therefore, in the position indicator 2B in FIG. 9, a part configured similarly to the position indicator 2 shown in FIG. 5 is given the same reference symbol and description of the part is omitted.

Also with the position indicator 2B of this example, a locus can be input through the first sensor 1C when the side of the core body 211 is used in contact with the operation region 1FW of the electronic equipment main body 1 similarly to the position indicator 2 described by using FIG. 5. This is because the position indicator 2B is detected only by the first sensor 1C in this case. On the other hand, when the side of the cap 221 of the position indicator 2B is used in contact with the operation region 1FW of the electronic equipment main body 1 as shown in FIG. 9, the position indicator 2B is detected both by the first sensor 1C and by the second sensor 1E, an erasure of an already-input locus can be carried out similarly to the case of using the position indicator 2 of the above-described embodiment.

Furthermore, if the position indicator 2B of this example is used, provision of the current driver 122 and the switch circuit SW in the part composed of the first sensor 1C and the control circuit CT1 thereof shown in FIG. 3 can be omitted. In addition, the contents of control by the controller 150 can be simplified.

[Other Uses]

In the above-described embodiment, when the side of the core body 211 of the position indicator 2, 2A, or 2B is brought into contact with the operation region 1FW, input processing of a locus is executed by utilizing the fact that the position indicator can be detected only by the first sensor 1C of the electromagnetic induction type. Furthermore, when the side of the cap 221 of the position indicator 2, 2A, or 2B is brought into contact with the operation region 1FW, erasure processing of a locus is executed by utilizing the fact that the position indicator can be detected both by the first sensor 1C of the electromagnetic induction type and by the second sensor 1E of the capacitive type. However, the processing executed depending on by which sensor the position indicator is detected is not limited to them. In the following, other uses relating to input of information by use of the position indicator 2, 2A, or 2B will be described.

[Input of Locus and Change in Attribute about Locus]

Input of a locus and change in an attribute of a locus can be carried out by using the position indicator 2, 2A, or 2B. For example, when the side of the core body 211 of the position indicator 2, 2A, or 2B is used in contact with the operation region 1FW, the indicated position can be detected only by the first sensor 1C. In this case, execution of input processing of a locus is enabled as with the above-described embodiment. Furthermore, when the side of the cap 221 of the position indicator 2, 2A, or 2B is used in contact with the operation region 1FW of the electronic equipment main body 1, the indicated position can be detected both by the first sensor 1C and by the second sensor 1E. In this case, a change in an attribute about a locus, such as the kind of line, the thickness of a line, or the color of a locus that has been input, is carried out.

In this case, the side of the cap 221 of the position indicator 2, 2A, or 2B is brought into contact with the position on the operation region 1FW corresponding to the display position of the part at which the attribute is desired to be changed in an already-input locus and this part is specified. Then, by carrying out, e.g., a tap operation on the specified part by using the side of the cap 221 of the position indicator 2, 2A, or 2B, the kind of line of the locus can be changed or the thickness of the locus can be changed or the color of the locus can be changed sequentially according to the tap operation.

Of course, which of attributes of the locus is to be changed may be selected in advance in the electronic equipment main body 1. Furthermore, how the attribute of the locus is changed is selected in advance. For example, the attribute of the locus is selected to turn the locus into a "thin dotted line." Then, when a part at which the attribute is desired to be changed in an already-input locus is specified by using the second end part side (side of the cap 221) of the position indicator 2, 2A, or 2B, immediately this locus part can be changed to the selected attribute.

[Input of Locus with Use of Different Sensors]

Furthermore, it is also possible to properly input a locus through the second sensor 1E while inputting a locus through the first sensor 1C. Specifically, in the above-described embodiment, the second sensor 1E is a sensor of the capacitive type. To the position detecting sensor of the capacitive type, operation can be carried out by using a so-called stylus pen in which electrically-conductive rubber or electrically-conductive cloth is used at the tip.

However, if a position detecting sensor of a capacitive type is mounted in a tablet PC or the like whose display screen (corresponding to the operation region 1FW) is comparatively large, when a user attempts to carry out operation with a stylus pen while putting a palm on the operation region, this position detecting sensor of the capacitive type detects the contact position of the palm. Thus, a problem that it is impossible to properly carry out only the operation with the stylus pen occurs in some cases.

There is also a method in which whether a contact is a contact of a palm or a contact of a stylus pen is identified by detecting the contact area. However, at the stage of the start of the contact, the contact area is small both with the palm and with the stylus pen and it is difficult to rapidly discriminate the contact of the palm and the contact of the stylus pen. Of course, there is also a method in which input with a stylus pen is enabled after it is confirmed that a contact with the operation region 1FW by the stylus pen is not a contact by a palm by checking the contact area in a time-series manner. However, in the case of using this method, a certain amount of time is necessary until it is settled that the contact is a contact by the stylus pen and therefore rapid information input is impossible in some cases.

Thus, suppose that the side of the cap 221 of the position indicator 2 is used in contact with the operation region 1FW. In this case, also as described above, a reflected signal from the resonant circuit 220 of the position indicator 2 is received by the first sensor 1C and the position indicator 2 is detected by the first sensor 1C. Simultaneously, the user who holds the position indicator 2 is electrically connected to the second sensor 1E through the chassis 21, the cap holding part 23, and the cap 221 of the position indicator 2. Thereby, the position indicator 2 is detected also by the second sensor 1E. Thus, the control circuit CT3 for displaying and so forth recognizes the position at which the position of the detection of the position indicator 2 through the first sensor 1C overlaps with the position of the detection of the position indicator 2 through the second sensor 1E as the position indicated by the user, and accepts input of a locus.

If this is employed, input of a locus can be properly carried out even when a palm of the user is in contact with the operation region 1FW in the case in which the side of the cap 221 of the position indicator 2 is used in contact with the operation region 1FW. This is because of the following reason. Specifically, regarding the part at which, e.g., a palm gets contact with the operation region 1FW, the contact position can be detected by the second sensor 1E but the contact position cannot be detected by the first sensor 1C. Thus, control can be so carried out that an input of such an indicated position is not accepted as a proper input.

Figure 9:
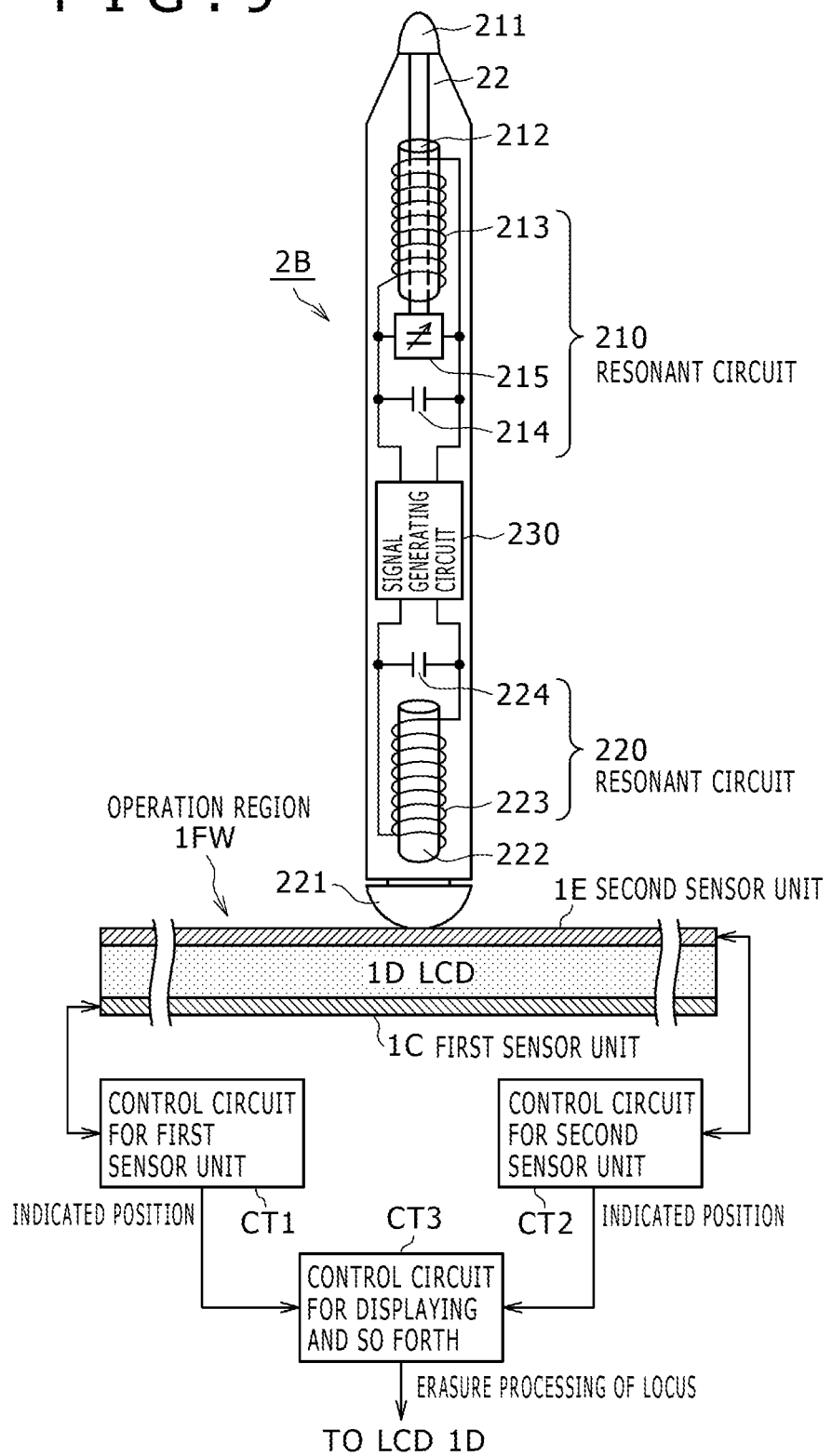
FIG. 9 is a diagram for explaining another example of the position indicator.

Such a way of use can be similarly carried out also when the position indicator 2B described by using FIG. 9 is used. That is, exclusive control of operation with use of a finger and a position indicator (stylus pen) is possible. Furthermore, using the first and second sensors 1C and 1E in combination can decrease the on-load of detection of the contact of the position indicator 2 or the like with the operation region 1FW.

Furthermore, this way of use can be similarly carried out basically also when the position indicator 2A described by using FIG. 8 is used. However, in the case of the position indicator 2A, only the resonant circuit 210 is included and therefore there is a need to prevent the indicated position based on a transmission signal from the resonant circuit 210 from reaching the contact part of a palm.

Other Modification Examples

In the above-described embodiments, the second sensor 1E is described as a sensor of a capacitive type. Therefore, as the second sensor 1E, a position detecting sensor of a surface capacitive type can be used besides a position detecting sensor of a projected capacitive type. That is, various position detecting sensors of a capacitive system can be used as the second sensor 1E. Furthermore, also as the first sensor 1C, various position detecting sensors of an electromagnetic induction type can be used.

Moreover, it is also possible to use a position detecting sensor of a resistive film system or a position detecting sensor of a surface acoustic wave system, for example, as the second sensor 1E.

In the above-described embodiments, description is made by taking as an example the case in which the input device composed of the position detecting device and the position indicator according to the present disclosure is applied to a tablet PC or a high-function mobile phone terminal including a display device such as an LCD. However, the application of the present disclosure is not limited thereto. For example, it is also possible to apply the present disclosure to an input device such as a so-called digitizer that is used while being connected to electronic equipment such as a personal computer and does not include a display device.

[Others]

Functions of the first sensor in the claims are implemented by the first sensor 1C and the second sensor is implemented by the second sensor 1E. Furthermore, functions of the first indicating circuit in the claims are implemented by the resonant circuits 210 and 220 of the position indicator and the second indicating circuit is implemented mainly by the cap 221 of the position indicator.

In addition, functions of the first detector in the claims are implemented by the control circuit CT1, and functions of the second detector are implemented by the control circuit CT2, and functions of the controller are implemented by the control circuit CT3 for displaying and so forth.

Moreover, the processing that is shown in FIG. 7 and is executed or performed by the control circuit CT3 for displaying and so forth corresponds to the input control method of a position detecting device according to the present disclosure. Furthermore, a program to execute or perform the processing that is shown in FIG. 7 and is executed or performed by the control circuit CT3 for displaying and so forth is an input control program corresponding to the input control method of a position detecting device according to the present disclosure, and is a program executed or performed by the control circuit CT3 for displaying and so forth.

DESCRIPTION OF REFERENCE SYMBOLS

1 Electronic equipment main body,
1A Chassis, 1B . . . Motherboard,
1C First sensor,
1D LCD,
1E Second sensor,
1F Front panel,
1FW Opening part,
1X Position detecting device,
CT1 Control circuit,
CT2 Control circuit,
CT3 Control circuit for displaying and so forth,
2 Position indicator,
21 Chassis,
21a Hollow part,
21b Opening part,
22 Tip portion,
22a Opening part,
22b Hollow part,
22c End part,
22d Projecting part,
23 Cap holding part,
23a Engagement receiving part,
24 Attachment part,
210 Resonant circuit,
211 Core body,
211a Indicating portion,
211b Locking portion,
211c Shaft portion,
211d End part,
212 Ferrite core,
213 Coil,
214 Capacitor,
215 Variable-capacitance capacitor,
220 Resonant circuit,
221 Cap,
221a Opening part,
221b Hollow part,
221c Engaging part,
222 Ferrite core,
223 Coil,
224 Capacitor

The invention claimed is:

1. A position detecting device that detects a position indicated by a position indicator having a pen shape based on two different types of sensors, the position detecting device comprising:
a first sensor which, in operation, detects an operation by the position indicator, the first sensor being of a first type;
a second sensor that overlaps the first sensor, wherein the second sensor, in operation, detects an operation by the position indicator, the second sensor being of a second type, the second type being different from the first type;
a first detection circuit which, in operation, detects the position indicator based on an output signal from the first sensor;
a second detection circuit which, in operation, detects the position indicator based on an output signal from the second sensor; and
a controller which, in operation, receives an output signal from the first detection circuit and an output signal from the second detection circuit and performs processing according to the output signals,
wherein the controller, in operation, changes contents of the processing according to when the controller is receiving only one of the output signal from the first detection circuit and the output signal from the second detection circuit and when the controller is receiving both the output signal from the first detection circuit and the output signal from the second detection circuit.

2. The position detecting device according to claim 1, wherein:
the controller, in operation, processes at least one of the output signals from the first and second detection circuits as an input operation of a locus according to an indicated position when the controller is receiving only one of the output signal from the first detection circuit and the output signal from the second detection circuit, and
the controller, in operation, processes a first one of the output signal of the first detection circuit and the output signal of the second detection circuit as an input operation of a locus according to the indicated position and processes a second one of the output signal of the first detection circuit and the output signal of the second detection circuit as an input of information relating to an attribute about the locus according to the indicated position when the controller is receiving both the output signal from of the first detection circuit and the output signal of the second detection circuit.

3. The position detecting device according to claim 2, wherein:
the controller processes the second one of the output signal of the first detection circuit and the output signal of the second detection circuit as an erasure operation regarding the locus that is input, as the attribute.

4. The position detecting device according to claim 1, wherein:
the first and second sensors are stacked with respect to a display surface of a display device and are incorporated in electronic equipment.

5. An input device, comprising:
a position indicator; and
a position detecting device that accepts an input of information by use of the position indicator,
wherein the position detecting device includes:
   a first sensor of a first type,
   a second sensor of a second type that is disposed overlapping the first sensor, the second type being different from the first type,
   a first detection circuit which, in operation, detects the position indicator based on an output signal from the first sensor,
   a second detection circuit which, in operation, detects the position indicator based on an output signal from the second sensor, and
   a controller coupled to the first and second detection circuits, wherein the controller, in operation, changes contents of processing according to when the controller is receiving only one of the output signal from the first detection circuit and the output second circuit and when the controller is receiving both the output signal from the first detection circuit and the output signal from the second detection circuit, and
wherein the position indicator includes:
   a chassis having a substantially tubular shape with a first end and a second end, the first end being different from the second end,
   a first indication circuit that is provided at both the first end and the second end of the chassis, wherein the first indication circuit, in operation, enables detection of the position indicator by the first sensor, and
   a second indication circuit that is provided at the second end of the chassis, wherein the second indication circuit, in operation, enables detection of the position indicator by the second sensor when the second end is brought into contact with the position detecting device.

* * * * *